July 7, 1925.
H. E. VAN VOORHEES
1,545,291
DEVICE FOR GRADING LEATHER AND OTHER MATERIALS
Filed June 29, 1922
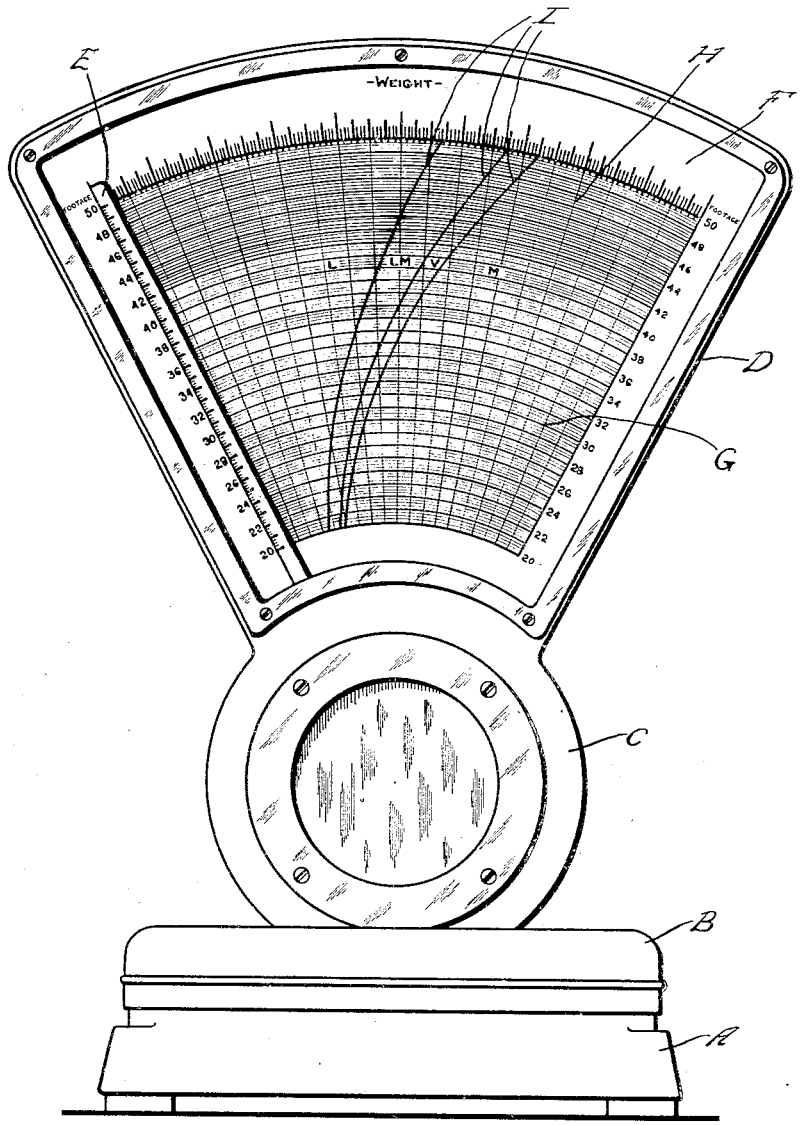
Inventor
Harold E. Van Voorhees
By Roberts, Roberts & Cushman
Attorneys Patented July 7, 1925.

1,545,291

UNITED STATES PATENT OFFICE.

HAROLD E. VAN VOORHEES, OF INDIANAPOLIS, INDIANA.

DEVICE FOR GRADING LEATHER AND OTHER MATERIALS.

Application filed June 29, 1922. Serial No. 571,789.

*To all whom it may concern:*

Be it known that I, HAROLD E. VAN VOORHEES, a citizen of the United States of America, and resident of Indianapolis, in the county of Marion and State of Indiana, have invented new and useful Improvements in Devices for Grading Leather and Other Materials, of which the following is a specification.

This invention relates to grading scales especially developed for the purpose of grading leather, but it will be evident from the disclosure that the inventive idea herein set forth may be readily adapted to the grading of many different materials.

The art of grading leather as heretofore practiced according to the individual skill of the workmen comprised feeling or looking at or measuring the leather in order to gage its thickness and weight per unit area, the grader then using his judgment in determining the grade of the skin. Methods such as this are highly empirical and far from scientifically accurate. The dividing lines between the grades cannot be accurately fixed or sharply defined, but vary with different graders and the same grader may reverse his decision in regard to the grade of a skin on a second test.

Objects of the invention are to grade materials with accuracy and uniformity, to avoid the uncertainty of prior methods of grading, to determine the grade scientifically without extensive calculation, to permit accurate grading to be done by unskilled operatives, and in general to overcome the defects of previous methods and apparatus.

The invention comprises apparatus having a material support downwardly movable in proportion to the quantity of material placed thereon together with a scale and an indicator arranged for relative movement proportional to the movement of said support, the scale being divided obliquely to the indicator into sections indicative of the grade of the material. Either the indicator or the scale may be movable in response to movement of the support, but in either case the indicator is elongate and the scale is two-dimensional, one dimension extending lengthwise of the indicator, and the other dimension along the path of movement of the indicator or scale. Either the indicator or the scale (or both) has spaced along the first said dimension gradations corresponding to the different quantities of materials to be graded. The aforesaid sections, which are oblique to both dimensions, are so positioned relatively to the loci of said gradations that the grade is indicated by the section over which stands the gradation corresponding to the quantity of material being graded.

In a more specific aspect the invention comprises a weighing device having a scale with graduations thereon corresponding to the dimensions of the pieces to be graded, said scale being divided into sections corresponding to the grades of the material so that given a certain dimension the position of the point on the scale determined by the weight and the given dimension indicates the proper grade for the material. The dividing lines marking the bounds of the grade sections of the scale may be curved or straight, depending upon the shape of the scale, and the kind of material being graded. The dividing lines may be of different colors or the sections of the scale indicating the grades may be tinted in different colors to facilitate reading the scale. It is likewise within the scope of the invention to provide a multiple grading scale which may take the form of superposed scales in which a single scale sheet is used but having more than one set of dividing lines thereon, each set being for a different kind of material and preferably in different colors, or the single scale sheet may have two or more scales on the same area. There is necessarily a scale for each kind of material to be graded, but it is sometimes possible or advisable to combine two or more scales upon one sheet as indicated.

For the purpose of illustrating the invention one concrete embodiment thereof is shown in the accompanying drawing, in which Fig. 1 is a front elevational view.

In the embodiment shown there is represented a weighing device of a well-known type comprising a base A, a weighing platform B and an upright portion C extending upwardly from base A, the upper portion D of which is generally segmental in form. The scale mechanism (not shown) is mounted in base A and upright portion C and operates an indicating arm E which is arranged to swing in an arc across the segmental portion D upon which a scale F is removably mounted.

The scale shown which is adapted for the grading of one species of leather, specifically degreased patent leather, comprises a plurality of concentric arcuate lines G extending transversely across the scale and a plurality of radial lines H extending in a generally up and down direction and intersecting lines G. The arcuate lines in the scale shown are graduations to indicate a chosen dimension of the material to be graded, such as the area or footage of the pieces of material, and the radial lines are graduations indicating weight. Extending obliquely across the scale are dividing or boundary lines I which divide the scale into sections indicated by the letters L, LM, V and M, each of these symbols indicating a certain grade of the leather. To facilitate the reading of the scale the scale arm E may have graduations thereon conforming to the arcuate lines which indicate the footage of the material.

In using the device the area of the leather is first determined, the piece is then placed on the platform B, and after the pointer comes to rest the grade of the leather is indicated directly by the section (L, LM, V or M) over which lies the graduation of the pointer corresponding to the area of the piece. For example, if the piece comprises 28 square feet and the graduation 28 on pointer E stands over the section LM, the leather is of LM grade.

The dividing lines I which form the essential feature of the scale may be determined in the following manner: A large number of pieces of material, in this case patent leather, are painstakingly graded according to the known methods and these pieces are carefully measured and weighed and the weight per foot of each piece is accurately determined. By a careful examination of these figures noting particularly the pieces or skins having the highest weight per foot for each grade and the lowest weight per foot for the next higher grade, the dividing points between the grades expressed in weight per foot are determined.

Using these figures as a basis, calculations are made for footage (in this instance from 20 to 50 feet) to determine the limits of the different grades. A scale or scale dial is then made with graduations H in one direction indicative of weight and graduations G substantially at right angles to the first gradations indicative of footage. The points corresponding to the above figures are then plotted and connected by lines, which are curved or straight depending upon the shape of the dial, these lines forming the dividing or boundary lines of the grade sections of the scale.

From the above it will be evident that a device of the type disclosed tends to eliminate inaccuracies, to make grading uniform, and to permit unskilled operatives to do more efficient and uniform grading than that heretofore done by experts.

I claim:

Apparatus for grading materials comprising a movable material support, a scale and an indicator arranged for relative movement on movement of said support, the indicator being elongate and the scale extending both transversely and longitudinally of the indicator, the elongate indicator having gradations there along corresponding to different quantities of material and the scale being divided, obliquely to the loci of the gradations on the indicator, into sections which are positioned to indicate the grade of the material by the registration of the gradations therewith respectively, whereby the grade of the material is indicated by the particular section which registers with the gradation of the indicator corresponding to the quantity of material on said movable support.

Signed by me at Boston, Mass., this 31st day of May, 1922.

HAROLD E. VAN VOORHEES.